US012524776B2

United States Patent
Zhang et al.

(10) Patent No.: US 12,524,776 B2
(45) Date of Patent: Jan. 13, 2026

(54) SYSTEM AND METHOD FOR DYNAMICALLY AND AUTOMATICALLY UPDATING ITEM PRICES ON E-COMMERCE PLATFORM

(71) Applicant: Walmart Apollo, LLC, Bentonville, AR (US)

(72) Inventors: Huidong Zhang, Cupertino, CA (US); Akshit Sarpal, Santa Clara, CA (US); Elliot Grenn Silva, New York, NY (US); Fangjing Fu, Bentonville, AR (US); Fangping Huang, Sunnyvale, CA (US); Yang Song, San Bruno, CA (US); Weihang Ren, Foster City, CA (US); Lijie Wan, Mountain View, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 150 days.

(21) Appl. No.: 18/132,190

(22) Filed: Apr. 7, 2023

(65) Prior Publication Data
US 2024/0338721 A1 Oct. 10, 2024

(51) Int. Cl.
*G06Q 30/0201* (2023.01)
*G06Q 30/0283* (2023.01)

(52) U.S. Cl.
CPC ..... *G06Q 30/0206* (2013.01); *G06Q 30/0283* (2013.01)

(58) Field of Classification Search
CPC .................. G06Q 30/0206; G06Q 30/0283
(Continued)

(56) References Cited

U.S. PATENT DOCUMENTS 8,000,996 B1 * 8/2011 Sanli ............. G06Q 30/02
705/7.35
8,639,558 B2 1/2014 Desai et al.
(Continued)

FOREIGN PATENT DOCUMENTS

CN 110335062 B * 7/2022 ......... G06Q 30/0224
WO WO-2011050371 A1 * 4/2011 ............. G06Q 10/04

OTHER PUBLICATIONS

S. Ramezani, P. A. N. Bosman and H. La Poutre, "Adaptive Strategies for Dynamic Pricing Agents," 2011 IEEE/WIC/ACM International Conferences on Web Intelligence and Intelligent Agent Technology, Lyon, France, 2011, pp. 323-328. (Year: 2011).*
(Continued)

*Primary Examiner* — Jeff Zimmerman
*Assistant Examiner* — Hunter Molnar
(74) *Attorney, Agent, or Firm* — Morgan, Lewis & Bockius LLP; Manita Rawat

(57) ABSTRACT

Systems and methods for dynamically and automatically updating item prices on e-commerce platform are disclosed. In some embodiments, an item is offered for purchase with a current price on a website. When price elasticity data and predicted demand data for the item are both available, a first markdown price is generated for the item using a first model based on: the price elasticity data, the predicted demand data, and the current price. When the price elasticity data and the predicted demand data are not both available, a second markdown price is generated for the item using a second model based on: a decay rate, the current price, and availability of the predicted demand data. A bounded price is generated by applying an upper bound and a lower bound to either the first markdown price or the second markdown price; and transmitted to a computing device for updating the current price of the item on the website.

20 Claims, 10 Drawing Sheets

(58) Field of Classification Search
USPC .......................................................... 705/7.35
See application file for complete search history.

(56) References Cited

U.S. PATENT DOCUMENTS

| | | | |
|---|---|---|---|
| 11,238,482 B1* | 2/2022 | Gaynor | G06Q 10/0875 |
| 2013/0103458 A1* | 4/2013 | Gupte | G06Q 30/02 |
| | | | 705/7.35 |
| 2017/0116653 A1* | 4/2017 | Smith | G06F 17/18 |
| 2019/0122176 A1* | 4/2019 | Wu | G06Q 30/0224 |
| 2019/0362374 A1 | 11/2019 | Mungoli et al. | |
| 2021/0142348 A1* | 5/2021 | Banerjee | G06F 16/254 |
| 2021/0224835 A1* | 7/2021 | Mehrotra | G06Q 30/0206 |
| 2021/0304243 A1* | 9/2021 | Le | G06Q 30/0205 |
| 2022/0092638 A1* | 3/2022 | Shankel | G06Q 30/0205 |
| 2024/0303680 A1* | 9/2024 | Shukla | G06Q 30/0202 |

OTHER PUBLICATIONS

Y. Chu, H.-K. Yang and W.-C. Peng, "Predicting Online User Purchase Behavior Based on Browsing History," 2019 IEEE 35th International Conference on Data Engineering Workshops (ICDEW), Macao, China, 2019, pp. 185-192. (Year: 2019).*

* cited by examiner

SYSTEM AND METHOD FOR DYNAMICALLY AND AUTOMATICALLY UPDATING ITEM PRICES ON E-COMMERCE PLATFORM

TECHNICAL FIELD

This application relates generally to e-commerce and, more particularly, to systems and methods for dynamically and automatically updating item prices on e-commerce platform.

BACKGROUND

A retailer or merchant may manage sales volume by manipulating pricing for various products. Price markdown is one of the key merchant operations to clear inventory of unsold, seasonal or perishable items by a specific date. Existing solutions for price markdown are mainly developed for physical stores. Due to the operation and label cost of each markdown, these systems only consider one or two markdown opportunities, e.g. an initial markdown and a second markdown according to the performance of the first one.

While for e-commerce platform, real-time and multiple price adjustments can be made during a markdown period, which allows retailers to keep up with sporadic changes of customer needs. The price markdown solutions for physical stores cannot be directly applied to e-commerce markdown, as those solutions are not dynamically based on daily collected features related to different items in e-commerce. In addition, some data, like price elasticity, may not be available for all the items, especially for items in cold start period which do not have enough historical data to infer the elasticity. As such, it is challenging and desirable to develop a method to properly and gradually reduce the item price to control sales at a pace that clears inventory just in time.

SUMMARY

The embodiments described herein are directed to systems and methods for dynamically and automatically updating item prices on e-commerce platform.

In various embodiments, a system including a non-transitory memory configured to store instructions thereon and at least one processor is disclosed. The at least one processor is configured to read the instructions to: identify an item being offered for purchase with a current price on a website, wherein the item is desired to reach a target inventory with a price markdown; determine whether price elasticity data is available for the item; determine whether predicted demand data is available for the item; when the price elasticity data and the predicted demand data are both available for the item, generate a first markdown price for the item using a first model based on: the price elasticity data, the predicted demand data, and the current price of the item; when the price elasticity data and the predicted demand data are not both available for the item, generate a second markdown price for the item using a second model based on: a decay rate, the current price of the item, and availability of the predicted demand data; generate a bounded price by applying an upper bound and a lower bound to either the first markdown price or the second markdown price; and transmit the bounded price to a computing device for updating the current price of the item on the website.

In various embodiments, a computer-implemented method is disclosed. The computer-implemented method includes: identifying an item being offered for purchase with a current price on a website, wherein the item is desired to reach a target inventory with a price markdown; determining whether price elasticity data is available for the item; determining whether predicted demand data is available for the item; when the price elasticity data and the predicted demand data are both available for the item, generating a first markdown price for the item using a first model based on: the price elasticity data, the predicted demand data, and the current price of the item; when the price elasticity data and the predicted demand data are not both available for the item, generating a second markdown price for the item using a second model based on: an exponential decay rate, the current price of the item, and availability of the predicted demand data; generating a bounded price by applying an upper bound and a lower bound to either the first markdown price or the second markdown price; and transmitting the bounded price to a computing device for updating the current price of the item on the website.

In various embodiments, a non-transitory computer readable medium having instructions stored thereon is disclosed. The instructions, when executed by at least one processor, cause at least one device to perform operations including: identifying an item being offered for purchase with a current price on a website, wherein the item is desired to reach a target inventory with a price markdown; determining whether price elasticity data is available for the item; determining whether predicted demand data is available for the item; when the price elasticity data and the predicted demand data are both available for the item, generating a first markdown price for the item using a first model based on: the price elasticity data, the predicted demand data, and the current price of the item; when the price elasticity data and the predicted demand data are not both available for the item, generating a second markdown price for the item using a second model based on: an exponential decay rate, the current price of the item, and availability of the predicted demand data; generating a bounded price by applying an upper bound and a lower bound to either the first markdown price or the second markdown price; and transmitting the bounded price to a computing device for updating the current price of the item on the website.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
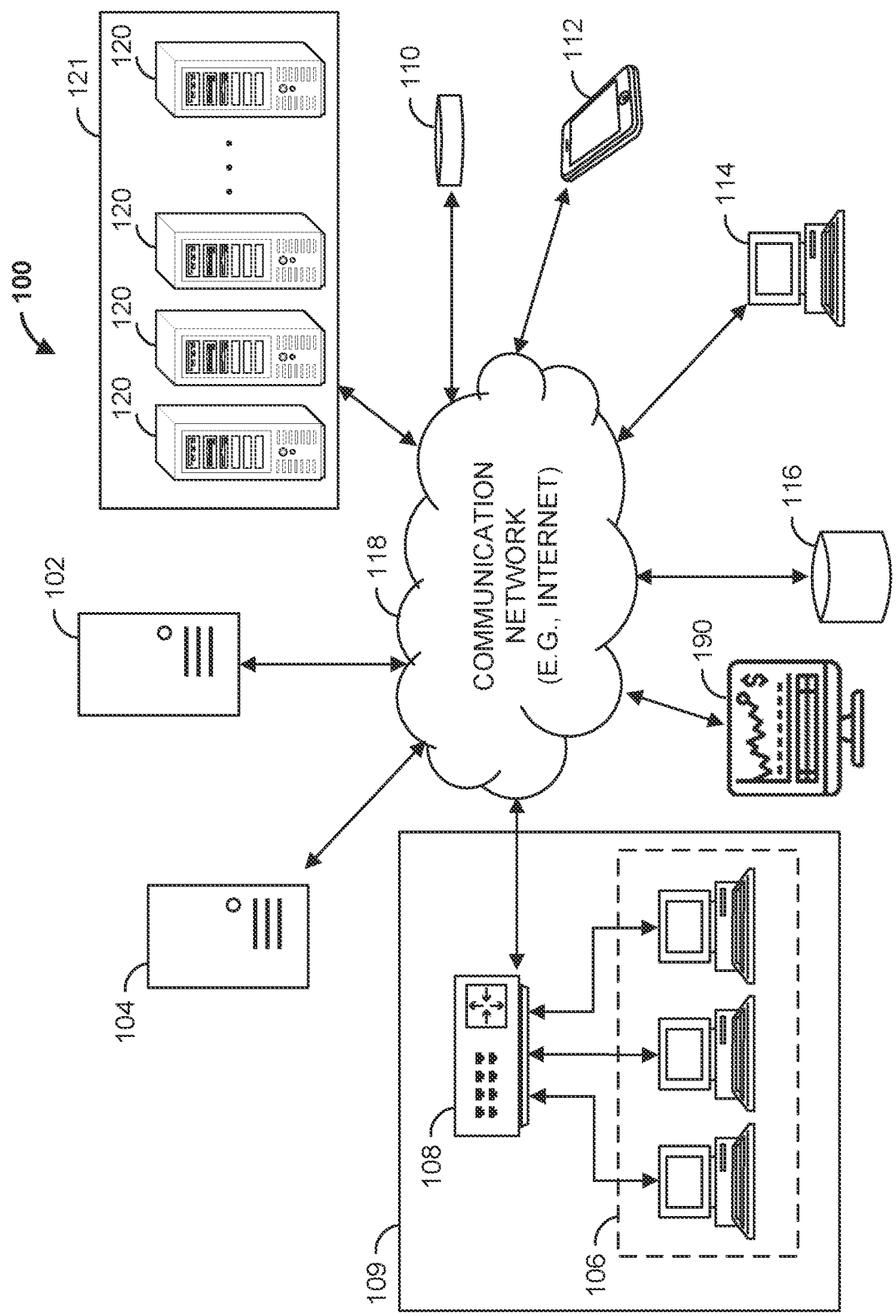
FIG. 1 is a network environment configured to update item prices dynamically and automatically on e-commerce platform, in accordance with some embodiments of the present teaching.

This description of the exemplary embodiments is intended to be read in connection with the accompanying drawings, which are to be considered part of the entire written description. Terms concerning data connections, coupling and the like, such as "connected" and "interconnected," and/or "in signal communication with" refer to a relationship wherein systems or elements are electrically and/or wirelessly connected to one another either directly or indirectly through intervening systems, as well as both moveable or rigid attachments or relationships, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages or alternative embodiments herein can be assigned to the other claimed objects and vice versa. In other words, claims for the systems can be improved with features described or claimed in the context of the methods. In this case, the functional features of the method are embodied by objective units of the systems.

E-commerce sales are sales initiated by customers digitally and fulfilled by a number of methods including some e-commerce fulfillment centers and/or some physical stores. Price markdown decisions for e-commerce should be made for each item to deliberately reduce price to increase sales velocity with an objective of maximizing sell-through rate while controlling contribution profit loss. This brings a great need to develop a formal and systematic method for dynamic decision-making of markdown price according to patterns in the daily collected data, including inventory left and demand response observed for different items.

The present teaching discloses an end-to-end price markdown system for e-commerce platform to predictively automate price actions while allowing for business or merchant configuration through an integrated interface, in order to dynamically control item sales velocities throughout a markdown period and clear inventory in time. In some embodiments of the present teaching, the markdown system utilizes a novel decision-making framework for dynamic price markdown on e-commerce platform to take advantage of real-time and multiple price adjustments capabilities as compared to physical stores.

In some embodiments, the markdown system leverages an enhanced demand forecasting model to periodically monitor and predict markdown performance with innovative features better capturing impact of recent past markdowns on item sales. The demand forecasting model may be a machine learning model trained based on historical sales data and date related features, and used to generate predicted demand data for a given item desired to reach a target inventory with a price markdown.

In some embodiments, two highly interpretable models or algorithms are implemented in the system to ensure stability and robustness of price reduction decisions, depending on availability of price elasticity data and demand forecasting data for markdown items. The two models in the system ensure price reduction decisions can be made, even in the absence of elasticity data, to control sales velocity and clear inventory or meet a target inventory in time.

Furthermore, in the following, various embodiments are described with respect to methods and systems for dynamically and automatically updating item prices on e-commerce platform are disclosed. In some embodiments, an item is offered for purchase with a current price on a website. When price elasticity data and predicted demand data for the item are both available, a first markdown price is generated for the item using a first model based on: the price elasticity data, the predicted demand data, and the current price. When the price elasticity data and the predicted demand data are not both available, a second markdown price is generated for the item using a second model based on: a decay rate, the current price, and availability of the predicted demand data. A bounded price is generated by applying an upper bound and a lower bound to either the first markdown price or the second markdown price; and transmitted to a computing device for updating the current price of the item on the website.

Turning to the drawings, FIG. 1 is a network environment 100 configured to update item prices dynamically and automatically on e-commerce platform, in accordance with some embodiments of the present teaching. The network environment 100 includes a plurality of devices or systems configured to communicate over one or more network channels, illustrated as a network cloud 118. For example, in various embodiments, the network environment 100 can include, but not limited to, a dynamic price computing device 102 (e.g., a server, such as an application server), a web server 104, a merchant computing device 190, a cloud-based engine 121 including one or more processing devices 120, workstation(s) 106, a database 116, and one or more customer computing devices 110, 112, 114 operatively coupled over the network 118. The dynamic price computing device 102, the web server 104, the merchant computing device 190, the workstation(s) 106, the processing device(s) 120, and the multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit and receive data over the communication network 118.

In some examples, each of the dynamic price computing device 102, the merchant computing device 190 and the processing device(s) 120 can be a computer, a workstation, a laptop, a server such as a cloud-based server, or any other suitable device. In some examples, each of the processing devices 120 is a server that includes one or more processing units, such as one or more graphical processing units (GPUs), one or more central processing units (CPUs), and/or one or more processing cores. Each processing device 120 may, in some examples, execute one or more virtual machines. In some examples, processing resources (e.g., capabilities) of the one or more processing devices 120 are offered as a cloud-based service (e.g., cloud computing). For example, the cloud-based engine 121 may offer computing and storage resources of the one or more processing devices 120 to the dynamic price computing device 102.

In some examples, each of the multiple customer computing devices 110, 112, 114 can be a cellular phone, a smart phone, a tablet, a personal assistant device, a voice assistant device, a digital assistant, a laptop, a computer, or any other suitable device. In some examples, the web server 104 hosts one or more websites providing one or more products or services. In some examples, the dynamic price computing device 102, the processing devices 120, and/or the web server 104 are operated by a retailer, and the multiple customer computing devices 110, 112, 114 are operated by customers of the retailer. In some examples, the processing devices 120 are operated by a third party (e.g., a cloud-computing provider).

In some examples, the merchant computing device 190 is operated by a merchant selling products or services via the one or more websites of the retailer. In some examples, the merchant computing device 190 desires to clear the inventory of a product item being sold via the retailer, e.g. through price markdown of the product item on the one or more websites.

The workstation(s) 106 are operably coupled to the communication network 118 via a router (or switch) 108. The workstation(s) 106 and/or the router 108 may be located at a store 109, for example. The workstation(s) 106 can communicate with the dynamic price computing device 102 over the communication network 118. The workstation(s) 106 may send data to, and receive data from, the dynamic price computing device 102. For example, the workstation(s) 106 may transmit data identifying items purchased by a customer at the store 109 to the dynamic price computing device 102.

Although FIG. 1 illustrates three customer computing devices 110, 112, 114, the network environment 100 can include any number of customer computing devices 110, 112, 114. Similarly, the network environment 100 can include any number of the dynamic price computing devices 102, the search engine servers 190, the processing devices 120, the workstations 106, the web servers 104, and the databases 116.

The communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The communication network 118 can provide access to, for example, the Internet.

In some embodiments, each of the first customer computing device 110, the second customer computing device 112, and the Nth customer computing device 114 may communicate with the web server 104 over the communication network 118. For example, each of the multiple computing devices 110, 112, 114 may be operable to view, access, and interact with a website, such as a retailer's website hosted by the web server 104. The web server 104 may transmit user session data related to a customer's activity (e.g., interactions) on the website. For example, a customer may operate one of the customer computing devices 110, 112, 114 to initiate a web browser that is directed to the website hosted by the web server 104. The customer may, via the web browser, view item advertisements for items displayed on the website, and may click on item advertisements, for example. The website may capture these activities as user session data, and transmit the user session data to the dynamic price computing device 102 over the communication network 118. The website may also allow the operator to add one or more of the items to an online shopping cart, and allow the customer to perform a "checkout" of the shopping cart to purchase the items. In some examples, the web server 104 transmits purchase data identifying items the customer has purchased from the website to the dynamic price computing device 102.

In some embodiments, the merchant computing device 190 may communicate with the web server 104 over the communication network 118. For example, the website hosted by the web server 104 may be associated with a merchant's portal, which is an integrated interface for a merchant to upload items to be offered for purchase on the website. In some examples, the merchant may identify, via the integrated interface, one or more of the uploaded items for price markdown. That is, for each of the identified items, the merchant desires its inventory to be cleared or reach a target inventory by a certain date, through the price markdown. After the merchant uploads and identifies a markdown item, the web server 104 may send a price update request, automatically or upon the merchant's request, to the dynamic price computing device 102 for updating the price of the item. The dynamic price computing device 102 may execute a markdown process automatically and dynamically based on daily collected features for the item, to generate an updated price for the item. Once the dynamic price computing device 102 transmits the updated price to the web server 104, the web server 104 may apply the updated price for the item on the website.

In some examples, the dynamic price computing device 102 may execute one or more models (e.g., algorithms), such as a machine learning model, deep learning model, statistical model, etc., to generate an updated price for each item desired to reach a target inventory. For example, a demand forecast for an item may be computed based on a machine learning model using historical aggregated features. The updated price for the item may be computed based on parameters including at least: the demand forecast, the current inventory, the target inventory, the price elasticity, and the current price of the item. In some embodiments, while the machine learning model may be trained monthly or quarterly or on demand, the demand forecast and/or the updated price for the item may be computed on a daily basis.

The dynamic price computing device 102 is further operable to communicate with the database 116 over the communication network 118. For example, the dynamic price computing device 102 can store data to, and read data from, the database 116. The database 116 can be a remote storage device, such as a cloud-based server, a disk (e.g., a hard disk), a memory device on another application server, a networked computer, or any other suitable remote storage. Although shown remote to the dynamic price computing device 102, in some examples, the database 116 can be a local storage device, such as a hard drive, a non-volatile memory, or a USB stick. The dynamic price computing device 102 may store purchase data received from the web server 104 in the database 116. The dynamic price computing device 102 may also receive from the web server 104 user session data identifying events associated with browsing sessions, and may store the user session data in the database 116.

In some examples, the dynamic price computing device 102 generates training data for a plurality of models (e.g., machine learning models, deep learning models, statistical models, algorithms, etc.) based on: e.g. historical customer session data, search data, purchase data, catalog data, price markdown data, price elasticity, predicted demand data, item related features, etc. The dynamic price computing device 102 trains the models based on their corresponding training data, and the dynamic price computing device 102 stores the models in a database, such as in the database 116 (e.g., a cloud storage).

The models, when executed by the dynamic price computing device 102, allow the dynamic price computing device 102 to compute an updated price for each item desired to reach a target inventory by a predetermined end date of markdown period. For example, the dynamic price computing device 102 may obtain the models from the database 116. The dynamic price computing device 102 may receive in real-time from the web server 104, a price update request identifying a request for updated price of an item. In response to receiving the request, the dynamic price computing device 102 may execute the models to compute the updated price based on most recent data and features related to the item.

In some examples, the dynamic price computing device 102 assigns the models (or parts thereof) for execution to one or more processing devices 120. For example, each model may be assigned to a virtual machine hosted by a processing device 120. The virtual machine may cause the models or parts thereof to execute on one or more processing units such as GPUs. In some examples, the virtual machines assign each model (or part thereof) among a plurality of processing units. Based on the output of the models, the dynamic price computing device 102 may update item prices dynamically and automatically on the e-commerce platform hosted by the web server 104.

Figure 2:
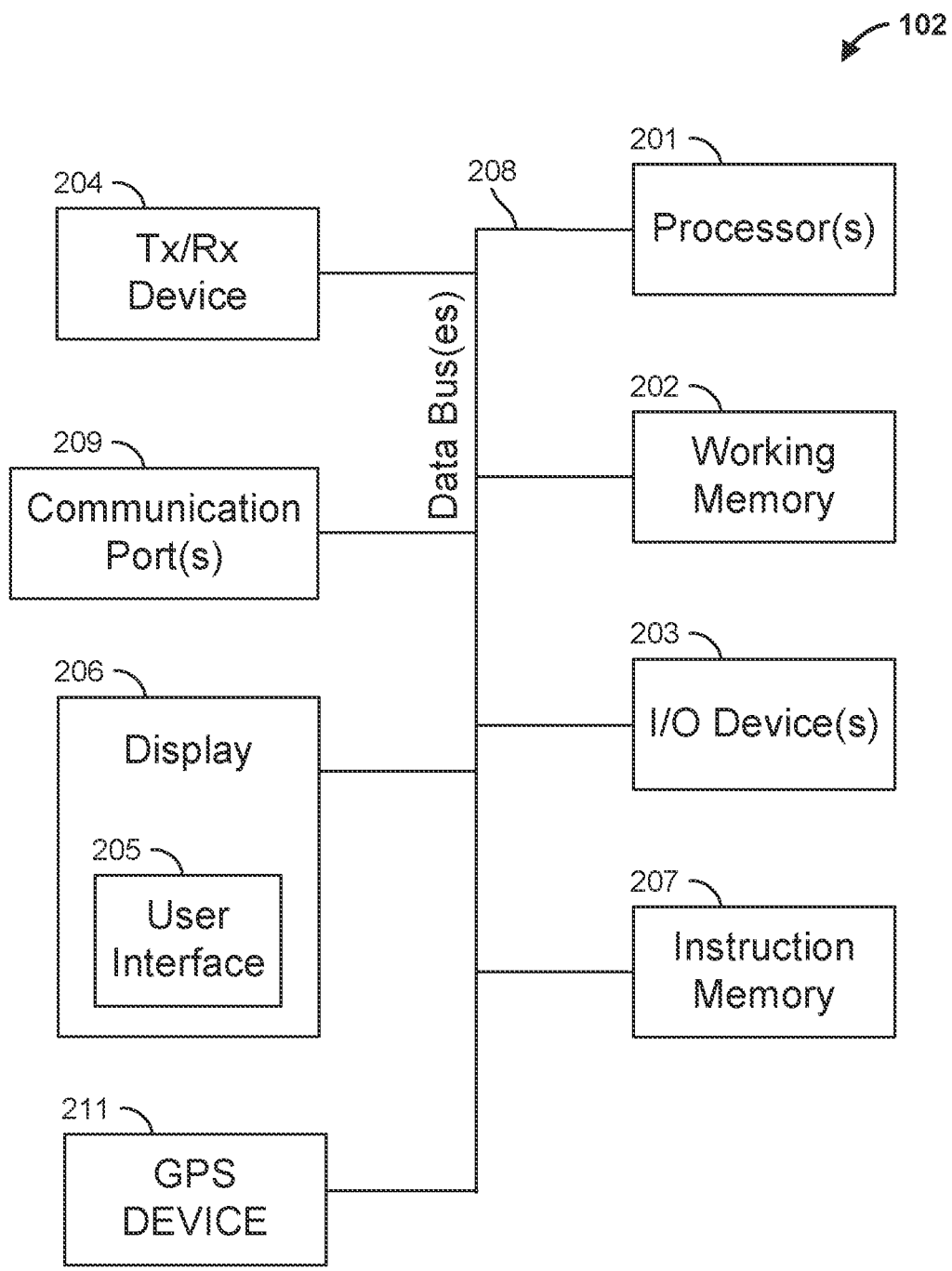
FIG. 2 is a block diagram of a dynamic price computing device, in accordance with some embodiments of the present teaching.

FIG. 2 illustrates a block diagram of a dynamic price computing device, e.g. the dynamic price computing device 102 of FIG. 1, in accordance with some embodiments of the present teaching. In some embodiments, each of the dynamic price computing device 102, the web server 104, the merchant computing device 190, the workstation(s) 106, the multiple customer computing devices 110, 112, 114, and the one or more processing devices 120 in FIG. 1 may include the features shown in FIG. 2. Although FIG. 2 is described with respect to the dynamic price computing device 102. It should be appreciated, however, that the elements described can be included, as applicable, in any of the dynamic price computing device 102, the web server 104, the merchant computing device 190, the workstation(s) 106, the multiple customer computing devices 110, 112, 114, and the one or more processing devices 120.

As shown in FIG. 2, the dynamic price computing device 102 can include one or more processors 201, a working memory 202, one or more input/output devices 203, an instruction memory 207, a transceiver 204, one or more communication ports 209, a display 206 with a user interface 205, and an optional global positioning system (GPS) device 211, all operatively coupled to one or more data buses 208. The data buses 208 allow for communication among the various devices. The data buses 208 can include wired, or wireless, communication channels.

The processors 201 can include one or more distinct processors, each having one or more cores. Each of the distinct processors can have the same or different structure. The processors 201 can include one or more central processing units (CPUs), one or more graphics processing units (GPUs), application specific integrated circuits (ASICs), digital signal processors (DSPs), and the like.

The instruction memory 207 can store instructions that can be accessed (e.g., read) and executed by the processors 201. For example, the instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. The processors 201 can be configured to perform a certain function or operation by executing code, stored on the instruction memory 207, embodying the function or operation. For example, the processors 201 can be configured to execute code stored in the instruction memory 207 to perform one or more of any function, method, or operation disclosed herein.

Additionally, the processors 201 can store data to, and read data from, the working memory 202. For example, the processors 201 can store a working set of instructions to the working memory 202, such as instructions loaded from the instruction memory 207. The processors 201 can also use the working memory 202 to store dynamic data created during the operation of the dynamic price computing device 102. The working memory 202 can be a random access memory (RAM) such as a static random access memory (SRAM) or dynamic random access memory (DRAM), or any other suitable memory.

The input-output devices 203 can include any suitable device that allows for data input or output. For example, the input-output devices 203 can include one or more of a keyboard, a touchpad, a mouse, a stylus, a touchscreen, a physical button, a speaker, a microphone, or any other suitable input or output device.

The communication port(s) 209 can include, for example, a serial port such as a universal asynchronous receiver/transmitter (UART) connection, a Universal Serial Bus (USB) connection, or any other suitable communication port or connection. In some examples, the communication port(s) 209 allows for the programming of executable instructions in the instruction memory 207. In some examples, the communication port(s) 209 allow for the transfer (e.g., uploading or downloading) of data, such as machine learning model training data.

The display 206 can be any suitable display, and may display the user interface 205. The user interfaces 205 can enable user interaction with the dynamic price computing device 102. For example, the user interface 205 can be a user interface for an application of a retailer that allows a customer to view and interact with a retailer's website. In some examples, a user can interact with the user interface 205 by engaging the input-output devices 203. In some examples, the display 206 can be a touchscreen, where the user interface 205 is displayed on the touchscreen.

The transceiver 204 allows for communication with a network, such as the communication network 118 of FIG. 1. For example, if the communication network 118 of FIG. 1 is a cellular network, the transceiver 204 is configured to allow communications with the cellular network. In some examples, the transceiver 204 is selected based on the type of the communication network 118 the dynamic price computing device 102 will be operating in. The processor(s) 201 is operable to receive data from, or send data to, a network, such as the communication network 118 of FIG. 1, via the transceiver 204.

The optional GPS device 211 may be communicatively coupled to the GPS and operable to receive position data from the GPS. For example, the GPS device 211 may receive position data identifying a latitude, and longitude, from a satellite of the GPS. Based on the position data, the dynamic price computing device 102 may determine a local geographical area (e.g., town, city, state, etc.) of its position. Based on the geographical area, the dynamic price computing device 102 may determine relevant trend data (e.g., trend data identifying events in the geographical area).

Figure 3:
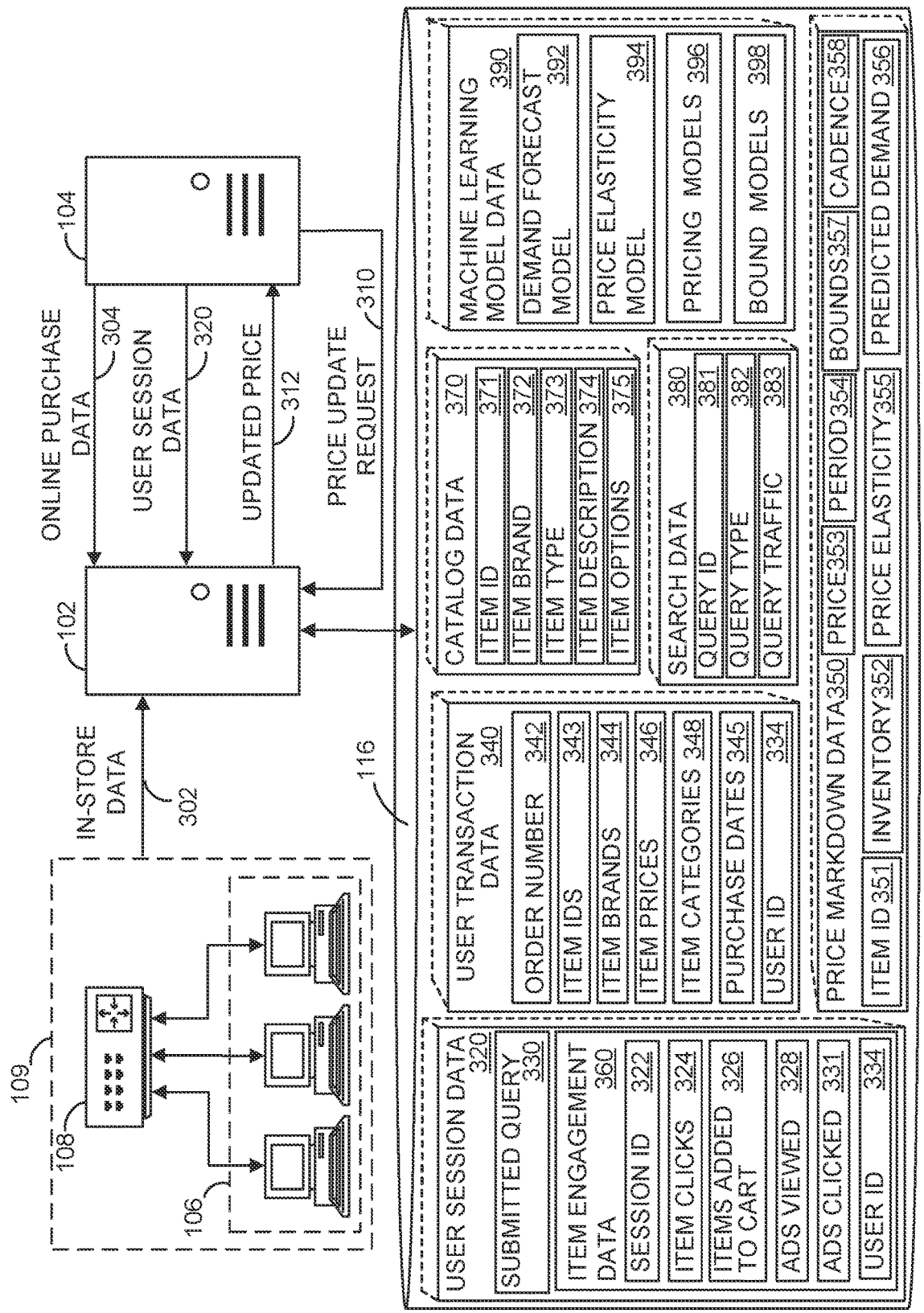
FIG. 3 is a block diagram illustrating various portions of a dynamic price markdown system, in accordance with some embodiments of the present teaching.

FIG. 3 is a block diagram illustrating various portions of a dynamic price markdown system, e.g. the dynamic price markdown system shown in the network environment 100 of FIG. 1, in accordance with some embodiments of the present teaching. As indicated in FIG. 3, the dynamic price computing device 102 may receive user session data 320 from the web server 104, and store the user session data 320 in the database 116. The user session data 320 may identify, for each user (e.g., customer), data related to that user's browsing session, such as when browsing a retailer's webpage hosted by the web server 104.

In some examples, the user session data 320 may include item engagement data 360 and/or submitted query data 330. The item engagement data 360 may include one or more of a session ID 322 (i.e., a website browsing session identifier), item clicks 324 identifying items which a user clicked (e.g., images of items for purchase, keywords to filter reviews for an item), items added-to-cart 326 identifying items added to the user's online shopping cart, advertisements viewed 328 identifying advertisements the user viewed during the browsing session, advertisements clicked 331 identifying advertisements the user clicked on, and user ID 334 (e.g., a customer ID, retailer website login ID, a cookie ID, etc.). The submitted query data 330 may identify one or more searches conducted by a user during a browsing session (e.g., a current browsing session).

The dynamic price computing device 102 may also receive online purchase data 304 from the web server 104, which identifies and characterizes one or more online purchases, such as purchases made by the user and other users via a retailer's website hosted by the web server 104. The dynamic price computing device 102 may also receive in-store data 302 from the store 109, which identifies and characterizes one or more in-store purchases, in-store advertisements, in-store shopping data, etc. In some embodiments, the in-store data 302 may also indicate availability of items in the store 109, and/or user IDs that have selected the store 109 as a default store for picking up online orders.

The dynamic price computing device 102 may parse the in-store data 302 and the online purchase data 304 to generate user transaction data 340. In this example, the user transaction data 340 may include, for each purchase, one or more of an order number 342 identifying a purchase order, item IDs 343 identifying one or more items purchased in the purchase order, item brands 344 identifying a brand for each item purchased, item prices 346 identifying the price of each item purchased, item categories 348 identifying a category of each item purchased, a purchase date 345 identifying the purchase date of the purchase order, and user ID 334 for the user making the corresponding purchase.

The database 116 may further store catalog data 370, which may identify one or more attributes of a plurality of items, such as a portion of or all items a retailer carries. The catalog data 370 may identify, for each of the plurality of items, an item ID 371 (e.g., an SKU number), item brand 372, item type 373 (e.g., a product type like grocery item such as milk, clothing item), item description 374 (e.g., a description of the product including product features, such as ingredients, benefits, use or consumption instructions, or any other suitable description), and item options 375 (e.g., item colors, sizes, flavors, etc.).

The database 116 may also store search data 380, which may identify one or more attributes of a plurality of queries submitted by users on the website hosted by the web server 104. The search data 380 may include, for each of the plurality of queries, a query ID 381 identifying a query previously submitted by users, a query type 382 (e.g., a head query, a torso query, or a tail query), and query traffic data 383 identifying how many times the query has been submitted or how many clicks the query has received.

In some examples, a merchant selling an item (e.g. a product or service) on the website hosted by the web server 104, may want to increase sales of the item by changing the price of the item for a time period, e.g. price markdown for one week, one month, a holiday season, or until a certain sales level is reached, e.g. when the inventory of the item is totally cleared or reaches a target inventory. During each markdown period, the dynamic price computing device 102 may interact with the web server 104 to compute updated prices for the item periodically, e.g. daily, or upon request from the merchant. As such, the dynamic price computing device 102 may obtain various data related to price markdown.

The database 116 may store price markdown data 350, which may identify data related to each markdown process of each item offered on the website. In some embodiments, the price markdown data 350 may include information related to various websites hosted by multiple retailers. In the example in FIG. 3, the price markdown data 350 includes: an item ID 351 identifying each item desired for price markdown; inventory data 352 identifying inventory levels of each item during each markdown period; price data 353 identifying prices for each item during each markdown period; period data 354 identifying start dates, end dates and durations for each markdown period of each item; price elasticity 355 identifying a responsive change of demand or sales quantity to a change of price for each item; predicted demand 356 identifying predicted demand, e.g. predicted sales rate, for each item in a future time period; bounds 357 identifying bounds applied to the price before each price update of an item; and cadence data 358 identifying a minimum quantity of days between two consecutive attempts to reduce price for an item. In some embodiments, the item ID 351 may be cross-referenced with the item IDs 343 and the item ID 371.

The database 116 may also store machine learning model data 390 identifying and characterizing one or more machine learning models and related data for dynamically updating prices for items. For example, the machine learning model data 390 may include a demand forecast model 392, a price elasticity model 394, pricing models 396, and bound models 398.

In some embodiments, the demand forecast model 392 may be used to generate predicted demand data for an item in a future time period. In some embodiments, the demand forecast model 392 may be a light gradient-boosting machine learning model trained based on historical features of a plurality of items offered for purchase on the website. For example, the historical features include at least one of: date and holiday related features, lagged sales features, inventory features, division features, and aggregated features generated from a plurality of most recent markdowns. After the demand forecast model 392 is trained, it can be applied to features constructed for the item based on collected data related to transactions of the item on the website, to predict a demand for the item in a future time period, e.g. predicted sales rate for the item in the remaining days of a markdown period.

The price elasticity model 394 may be used to compute a price elasticity of an item, e.g. based on historical sales and price. In some embodiments, the price elasticity is computed by the dynamic price computing device 102. In some embodiments, the price elasticity is computed by another device and is obtained by the dynamic price computing device 102.

The pricing models 396 may be used to generate prices or updated prices for different items. In some embodiments, the pricing models 396 may be used to compute updated prices for each item desired to reach a target inventory by end of a markdown period. In some embodiments, the pricing models 396 may include a maximal sell-through rate pricing model, used to compute an updated price for an item when price elasticity data and predicted demand data are both available for the item. In some embodiments, the maximal sell-through rate pricing model may update the current price of the item using a decay rate computed based on: a desired sales rate, a predicted sales rate in the predicted demand data, and the price elasticity of the item. The desired sales rate may be computed based on: a current inventory of the item, the target inventory of the item, and a number of days left before the end date of the markdown period. A sales rate, as in either predicted sales rate or desired sales rate, may indicate sales per day for an item.

For some items, e.g. items in a cold start period, they may not have price elasticity data and/or predicted demand data yet in the system. In some embodiments, the pricing models 396 may also include a gradual liquidation pricing model, used to compute an updated price for an item when the price elasticity data and predicted demand data are not both available for the item. In some embodiments, the gradual liquidation pricing model may update the current price of the item using an exponential decay rate computed based on: a floor price set for the item, the current price of the item, a cadence for the item, and a number of days left before the end date of the markdown period. The cadence for the item indicates a minimum quantity of days between two consecutive attempts to reduce price of the item.

The bound models 398 may be used to generate a bound price by applying bounds to a price computed based on the pricing models 396. In some embodiments, the bound models 398 may include an upper bound model identifying an upper bound for each updated price. For example, the upper bound may be determined based on a minimum of (a) the current price of the item and (b) a universal upper bound, which may be predetermined by the merchant or according to a pre-set algorithm.

In some embodiments, the bound models 398 may also include a lower bound model identifying a lower bound for each updated price. For example, the lower bound may be determined based on a maximum of (c) a discounted price by applying a maximum allowed discount on the current price and (d) a universal lower bound, which may be predetermined by the merchant or according to a pre-set algorithm.

In some examples, the dynamic price computing device 102 receives (e.g., in real-time) a price update request 310 from the web server 104. In some embodiments, the price update request 310 may be generated after a merchant uploads an item for markdown via the merchant computing device 190, e.g. through an integrated interface of the website hosted by the web server 104. In response, the dynamic price computing device 102 generates an updated price 312 for the item, e.g. using one or more model learning models 390 based on data related to the item in the database 116. In some embodiments, the dynamic price computing device 102 may transmit the updated price 312 to the web server 104 in response to the price update request 310. In some embodiments, after receiving the price update request 310, the dynamic price computing device 102 may periodically (e.g. daily) generate and transmit the updated price 312 to the web server 104, to update the price of the item on the website, until an end date of the markdown period for the item or until the inventory of the item reaches a predetermined target.

In some embodiments, the dynamic price computing device 102 may assign one or more of the above described operations to a different processing unit or virtual machine hosted by the one or more processing devices 120. Further, the dynamic price computing device 102 may obtain the outputs of the these assigned operations from the processing units, and compute updated prices 312 based on the outputs.

Figure 4:
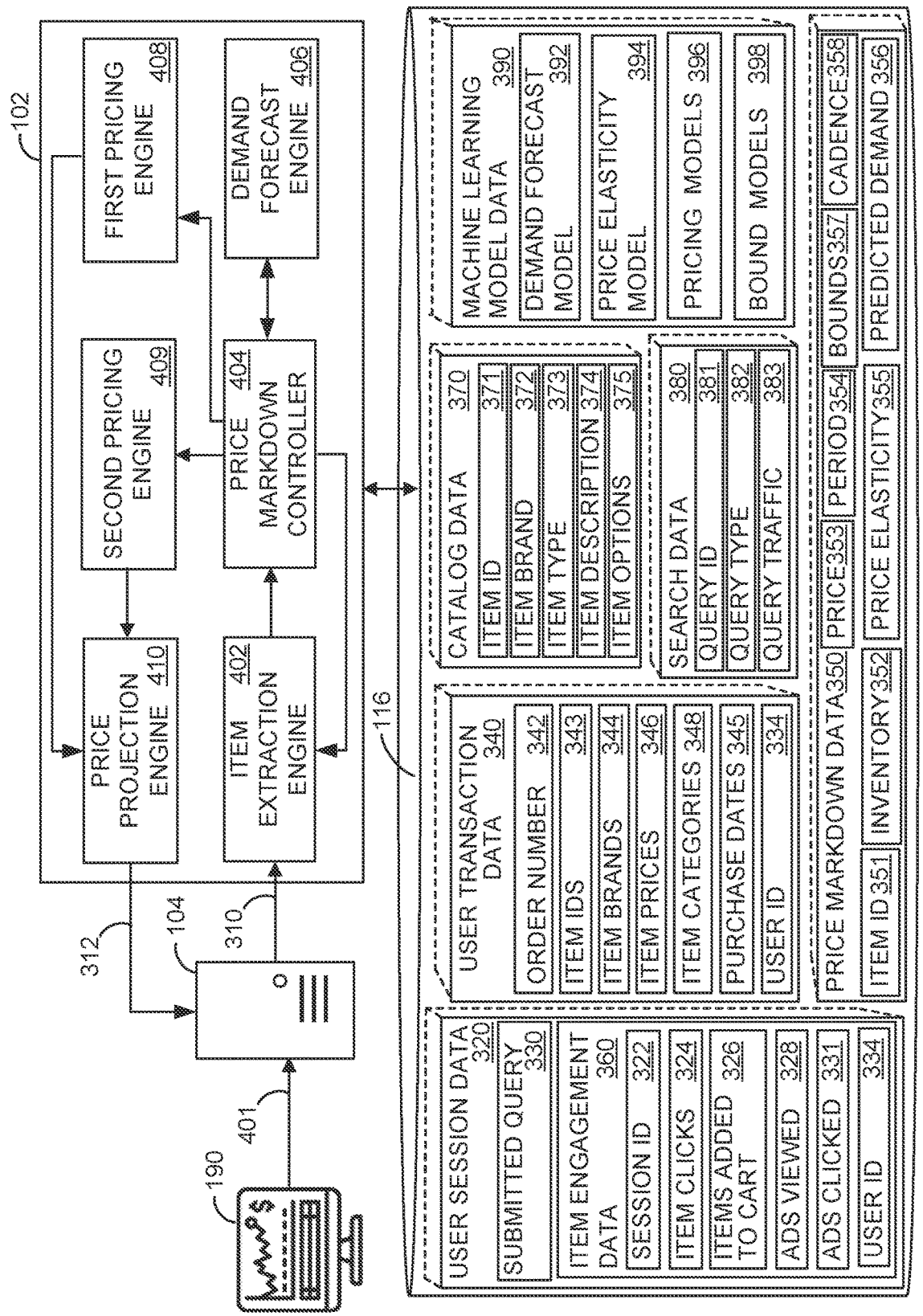
FIG. 4 is a block diagram illustrating various portions of a dynamic price computing device, in accordance with some embodiments of the present teaching.

FIG. 4 is a block diagram illustrating various portions of an dynamic price computing device, e.g. the dynamic price computing device 102 in FIG. 1, in accordance with some embodiments of the present teaching. As shown in FIG. 4, the dynamic price computing device 102 includes an item extraction engine 402, a price markdown controller 404, a demand forecast engine 406, a first pricing engine 408, a second pricing engine 409, and a price projection engine 410. In some examples, one or more of the item extraction engine 402, the price markdown controller 404, the demand forecast engine 406, the first pricing engine 408, the second pricing engine 409, and the price projection engine 410 are implemented in hardware. In some examples, one or more of the item extraction engine 402, the price markdown controller 404, the demand forecast engine 406, the first pricing engine 408, the second pricing engine 409, and the price projection engine 410 are implemented as an executable program maintained in a tangible, non-transitory memory, such as instruction memory 207 of FIG. 2, which may be executed by one or processors, such as the processor 201 of FIG. 2.

For example, the item extraction engine 402 may obtain from the web server 104 a price update request 310, as a message 401 is sent from the merchant computing device 190 to the web server 104 via an integrated interface. The message 401 sent by a merchant using the merchant computing device 190 may indicate an upload or identification of an item for price markdown. The merchant computing device 190 may send, within or together with the message 401, inputs of the merchant, wherein the inputs may indicate the following information regarding the item: an identification of the item, a start date of a markdown period, an end date of the markdown period, the target inventory, a floor price, and a cadence indicating a minimum quantity of days between two consecutive attempts to reduce price of the item.

In some embodiments, the item extraction engine 402 may identify the item based on the price update request 310, and extract the item from a markdown pipeline or a markdown queue including a series of items to go through markdown process. In addition, the item extraction engine 402 may obtain data related to the item (e.g. price elasticity, demand forecast, etc.) from the database 116. For example, the item extraction engine 402 may obtain price markdown data and sales related data associated with the item, e.g. by parsing the user session data 320, the user transaction data 340, the catalog data 370, the search data 380, and/or the price markdown data 350 in the database 116. The item extraction engine 402 may send the extracted item and data to the price markdown controller 404.

In some embodiments, the price markdown controller 404 can obtain various data related to each item for markdown from the item extraction engine 402. In some embodiments, the price markdown controller 404 can extract various data related to each item for markdown directly from the database 116. In some embodiments, the price markdown controller 404 can control whether and how to compute an updated price for each item based on e.g. inventory level, time information, and availability of various data for the item.

In some embodiments, the price markdown controller 404 may determine whether an inventory of the item has reached the target inventory and whether a current time has reached (or passed) the end date of the markdown period. If the inventory of the item has already reached the target inventory or if the current time has reached (or passed) the end date of the markdown period, the price markdown controller 404 may stop the entire markdown process for the item, and send an indication to the item extraction engine 402 to extract another item for markdown. In this case, the price of the item may go back the original price or a default price, or stay with the most updated price.

In some embodiments, if the inventory of the item has not reached the target inventory and the current time has not reached the end date of the markdown period, the price markdown controller 404 may determine whether the cadence of the item indicates it is time to update the price of the item. If it is not time to update the price yet (e.g. due to an update in a very recent past time period), the price markdown controller 404 may skip the pricing operations for the item, and send the item back to the item extraction engine 402 to put the item back into the pipeline to wait for another round or time period to update price. The price markdown controller 404 may also send an indication to the item extraction engine 402 to extract another item for markdown.

In some embodiments, if it is time to update the price based on the cadence and the current time, the price markdown controller 404 may determine whether the price elasticity data and demand forecast data are both available for the item. The price markdown controller 404 may check and/or obtain the price elasticity data and the demand forecast data of the item via the price update request 310, or directly from the database 116. In some embodiments, to check and/or obtain the demand forecast data, the price markdown controller 404 may send a request to the demand forecast engine 406. The demand forecast engine 406 can execute a machine learning model, e.g. the demand forecast model 392, to compute the demand forecast data for the item. For example, the demand forecast engine 406 may compute a predicted sales rate for the item in the remaining days of the markdown period, given the current price of the item. In some embodiments, the demand forecast engine 406 may train the demand forecast model 392 monthly or quarterly with newly collected data of multiple items, and execute the demand forecast model 392 daily for the item using daily collected data for a daily update of the item price. For some cold start items, the demand forecast engine 406 cannot compute the demand forecast data as there are not enough historical sales and/or markdown data for them. As such, the demand forecast engine 406 may send either the computed demand forecast data or an indication of no data to the price markdown controller 404, for each item.

Based on availability of the price elasticity data and demand forecast data for the item, the price markdown controller 404 can determine which pricing model is used to compute the updated price for the item. For example, when the price elasticity data and demand forecast data are both available for the item, the price markdown controller 404 may send the collected data to the first pricing engine 408, which can generate a first markdown price for the item using a first pricing model based on: the price elasticity data, the predicted demand data, and the current price of the item. The first pricing engine 408 can send the first markdown price to the price projection engine 410.

When the price elasticity data and demand forecast data are not both available for the item, the price markdown controller 404 may send the collected data to the second pricing engine 409, which can generate a second markdown price for the item using a second pricing model based on: a decay rate, the current price of the item, and availability of the predicted demand data. In some embodiments, the first pricing model may be a maximal sell-through rate pricing model; and the second pricing model may be a gradual liquidation pricing model. The second pricing engine 409 can send the second markdown price to the price projection engine 410.

The price projection engine 410 in this example may obtain either the first markdown price from the first pricing engine 408, or the second markdown price from the second pricing engine 409. The price projection engine 410 may generate a bounded price by applying an upper bound and a lower bound to either the first markdown price or the second markdown price. The upper bound and the lower bound may be determined based on the bound models 398. As such, the price projection engine 410 can project each price generated by the first pricing engine 408 or the second pricing engine 409 to a bounded interval, to generate a bounded price. The price projection engine 410 may send the bounded price, as an updated price 312, to the web server 104, in a data format (e.g., message) acceptable by the web server 104. The web server 104 can update the price of the item on the website once receiving the updated price 312.

In some embodiments, to start a markdown process, items are onboarded to the system by merchants through an integrated interface. Some business inputs may be uploaded together with item identifications, e.g. from a merchant user's device. The inputs may indicate the following information regarding the item: a start date of a markdown period, an end date of the markdown period, a target inventory desired to achieve before the end date, a floor price identifying a minimum price can be applied during the markdown period, and a cadence indicating a minimum quantity of days between two consecutive attempts to reduce price of the item. For example, if the cadence is N for an item, this item will be "awake" for markdown every N days, and it will be "sleep" and not be re-priced on days between the "awake" days. This allows the system to have a certain amount of time to observe customers' reaction to the updated price after each markdown. In some embodiments, AB tests can be conducted to share heuristics for setting these business parameters including cadence, start and end date, etc.

To achieve the maximal sell-through rate while controlling contribution profit loss for each item during its markdown period, an end-to-end markdown system is disclosed, as shown in FIGS. 1-4 merely for exemplary and illustrative purposes. One or more components in any of FIGS. 1-4 can be removed, modified or replaced according to various embodiments of the end-to-end markdown system, without departing from the scope or spirit of this disclosure. In some embodiments, a sell-through rate is the percentage of sales achieved for an item as compared with its entire on-hand inventory. In some embodiments, a contribution profit is determined by all the revenue collected minus all the cost related to the item sales, e.g. all inventory holding cost and all the transportation cost. As the price of an item is reduced following a markdown process, the item will naturally receive less revenue but may reduce some cost like inventory holding cost, which may or may not trigger contribution profit loss.

After the item onboarding process where items are onboarded to the system by merchants through an integrated interface, the system enters a price generation process followed by a downstream execution process, both running on a daily basis. The price generation process generates an updated price for each item extracted from the markdown pipeline, which may be performed by the dynamic price computing device 102. The downstream execution process updates item price on the website whenever the updated price is received, which may be performed by the web server 104.

Figure 5:
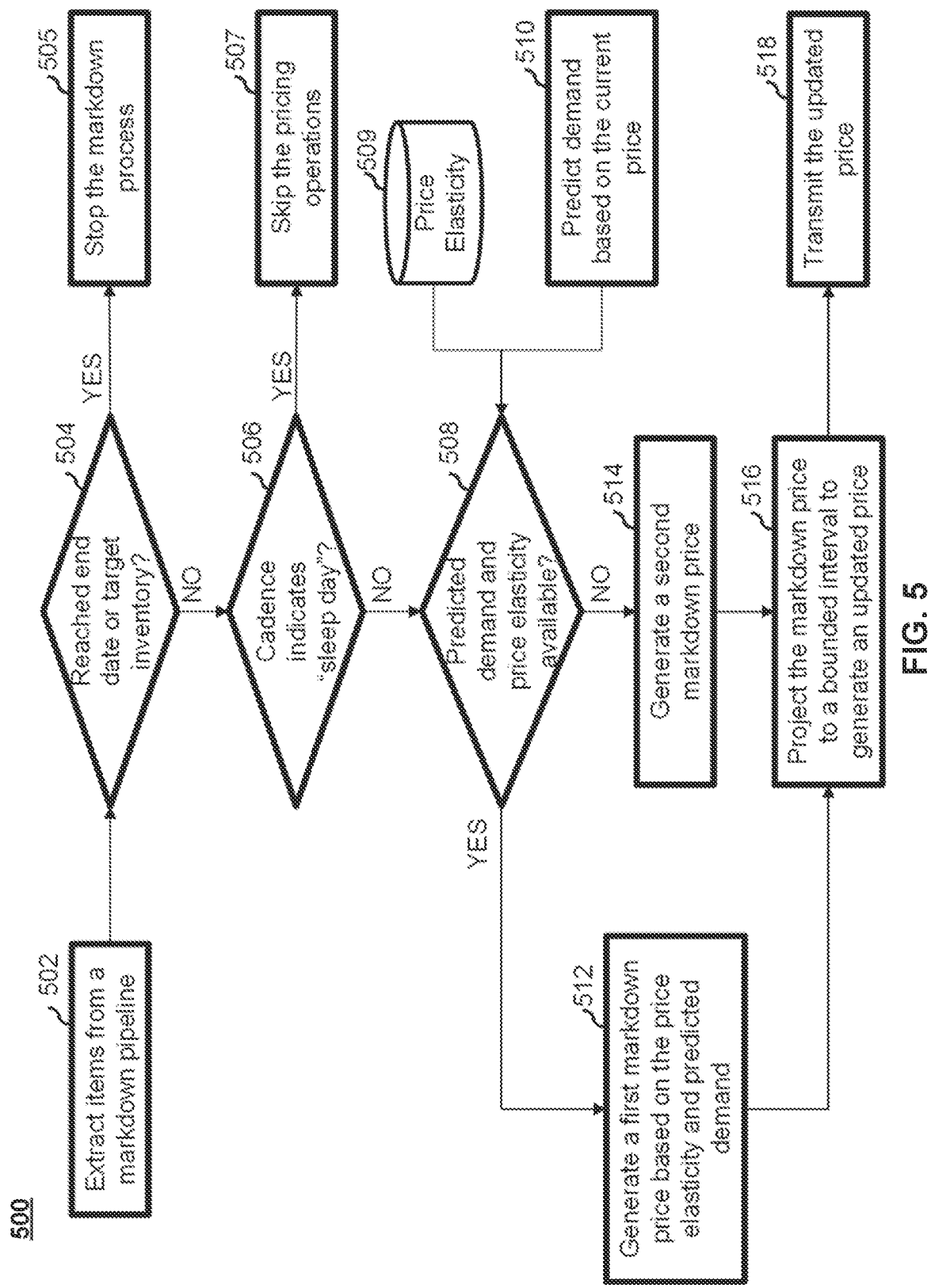
FIG. 5 illustrates an exemplary process for dynamically and automatically updating item prices, in accordance with some embodiments of the present teaching.

FIG. 5 illustrates a process 500 for dynamically and automatically updating item prices, in accordance with some embodiments of the present teaching. In some embodiments, the process 500 may be a price generation process, as part of a markdown process, carried out by one or more computing devices, such as the dynamic price computing device 102 and/or the cloud-based engine 121 of FIG. 1. As shown in FIG. 5, the process 500 starts from operation 502, where items are extracted from a markdown pipeline. In some embodiment, the operation 502 may be performed by the item extraction engine 402 in the dynamic price computing device 102. In some embodiments, the markdown pipeline may include a series of items desired to go through the markdown process. The item extraction engine 402 may extract only items that are active today in the markdown pipeline.

The remaining operations 504~518 in FIG. 5 can be performed for each item in parallel. The following descriptions regarding operations 504~518 will focus on one extracted item for simplicity. The item may be offered for purchase with a current price on a website, and is desired to reach a target inventory with a price markdown by the end date of the markdown period.

At operation 504, it is determined: whether the item has reached the target inventory, and whether a current time has reached the end date of the markdown period. When the item has reached the target inventory or the current time has reached the end date, the process goes to operation 505 to stop the markdown process for the item. When the item has not reached the target inventory and the current time has not reached the end date, the process goes to operation 506 to determine whether the cadence indicates a sleep day for the item. As discussed above, the current price of the item can only be changed when the current time is in an awake day for the item. The awake day is set based on a cadence and a previous date when the item's price was changed last time, e.g. N days from the last price change.

When the cadence indicates a sleep day for the item at operation 506, the current price cannot be changed. As such, the process goes to operation 507 to skip the pricing operations for the item, where the item may be put back into the markdown pipeline without price update. As the process can run on a daily basis, the item's price may be changed on a later date when the item is extracted again from the markdown pipeline.

When the cadence does not indicate a sleep day for the item at operation 506, the current price can be changed. As such, a markdown price will be generated, if the item has not reached its target inventory and end date, and today is its "awake" day according to its cadence. Then the process goes to operation 510, to determine whether price elasticity data is available for the item, and determine whether predicted demand data is available for the item. In some embodiments, the operations 504~508 may be performed by the price markdown controller 404 in the dynamic price computing device 102.

In some embodiments, the price elasticity data may be obtained from a price elasticity database 509, which may be part of the database 116 or a standalone database. The price elasticity data may not be available if the item is a cold start item just uploaded to the website not long ago.

In some embodiments, the predicted demand data may be generated at operation 510, where a light gradient-boosting machine learning model may be applied to historical data and features of the item to generate the predicted demand data for the item. In some embodiments, the predicted demand data includes a predicted sales rate for the item under its current price in the coining days, e.g. the remaining days in the markdown period. That is, the predicted demand data can indicate what would be the sales quantity per day for the item if it keeps its current price to the end date of the markdown period. In some embodiments, the operation 510 may be performed by the demand forecast engine 406 in the dynamic price computing device 102, e.g. upon a request from the price markdown controller 404.

When the price elasticity data and the predicted demand data are both available for the item at the operation 508, the process goes to operation 512 to generate a first markdown price for the item using a first model based on: the price elasticity data, the predicted demand data, and the current price of the item. Then the process goes to operation 516. In some embodiments, the first model may be a maximal sell-through rate pricing model. In some embodiments, the operation 512 may be performed by the first pricing engine 408 in the dynamic price computing device 102.

In some embodiments, the first markdown price is computed based on: computing a desired sales rate for the item based on: a current inventory of the item, the target inventory of the item, and a number of days left before the end date; computing a decay rate for the item based on: the desired sales rate, the predicted sales rate, and the price elasticity data; and computing the first markdown price based on the current price and the decay rate. The first markdown price is generated with an objective of clearing inventory to the target value by the end date of the markdown period. According to one definition of elasticity (% change in demand/% change in price) and based on the predicted sales rate obtained from the predicted demand data, the first markdown price may be computed based on the following equation.

$$\text{First markdown price} = \text{Current price} + \text{Current price} \frac{\text{Desired sales rate} - \text{Predicted sales rate}}{\text{Elasticity} \times \text{Predicted sales rate}}, \quad (1)$$

where Desired sales rate = (Current inventory − Target inventory)/

-continued

Number of days left in markdown period.

When the price elasticity data and the predicted demand data are not both available for the item at the operation 508, the process goes to operation 514 to generate a second markdown price for the item using a second model based on: a decay rate, the current price of the item, and availability of the predicted demand data. Then the process goes to operation 516. In some embodiments, the second model may be a gradual liquidation pricing model. In some embodiments, the operation 514 may be performed by the second pricing engine 409 in the dynamic price computing device 102. In some embodiments, more details in the operation 514 will be discussed referring to FIGS. 7-8. The term "second markdown price" used in this disclosure is named merely to distinguish with the "first markdown price," and does not necessarily mean that the second markdown price is generated sequentially or timewise after the first markdown price.

At operation 516, the markdown price, which may be either the first markdown price generated at operation 512 or the second markdown price generated at operation 514, is projected to a bounded interval to generate an updated price. In some embodiments, the bounded interval is a pre-defined price interval. This allows merchants to provide constraints according to business requirements, e.g. a maximal allowed price drop percentage for each markdown.

In some embodiments, the updated price is a bounded price generated by applying both an upper bound and a lower bound to either the first markdown price or the second markdown price. In some embodiments, the upper bound is computed based on a minimum of (a) the current price and (b) a universal upper bound; and the lower bound is computed based on a maximum of (c) a discounted price by applying a maximum allowed discount on the current price and (d) a universal lower bound. In some embodiments, if the markdown price (being either the first markdown price or the second markdown price) is greater than the upper bound, then the markdown price will be set equal to the upper bound; if the markdown price is lower than the lower bound, then the markdown price will be set equal to lower bound.

At operation 518, the updated price is transmitted to a computing device for updating the current price of the item on the website via downstream price execution. In some embodiments, the computing device is associated with the web server 104 hosting the website. In some embodiments, the item is to be displayed with the updated price on a webpage of the website, wherein the webpage includes at least one of: a home page of the website, a grocery page including grocery items, an item page including an anchor item, or a promotion page including seasonal or holiday deals. In some embodiments, the operations 516 and 518 may be performed by the price projection engine 410 in the dynamic price computing device 102.

Figure 6:
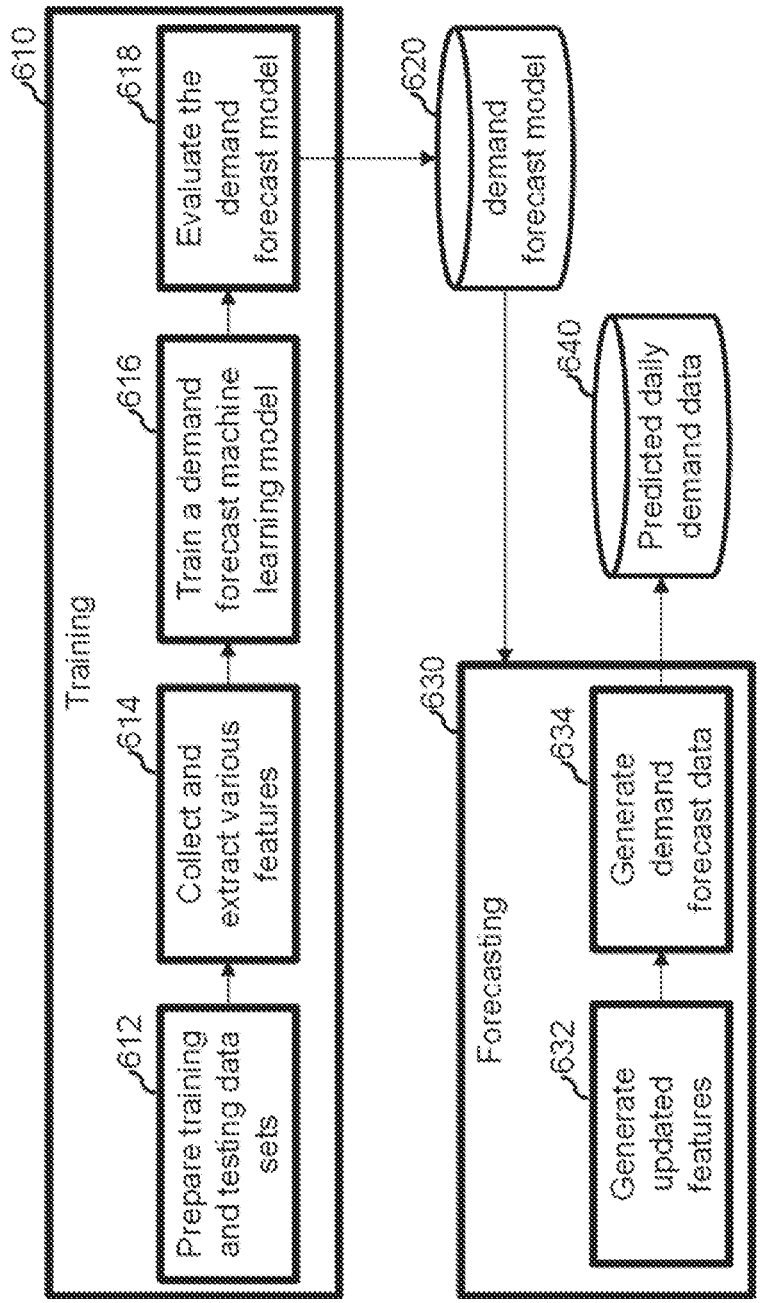
FIG. 6 illustrates an exemplary process for training a machine learning model and forecasting demand using the machine learning model, in accordance with some embodiments of the present teaching.

FIG. 6 illustrates a process 600 for training a machine learning model and forecasting demand using the machine learning model, in accordance with some embodiments of the present teaching. In some embodiments, the process 600 may be carried out by one or more computing devices, such as the dynamic price computing device 102 and/or the cloud-based engine 121 of FIG. 1. In some embodiments, the process 600 may be carried out by the demand forecast engine 406 in the dynamic price computing device 102.

As shown in FIG. 6, the process 600 starts from operations 610, including operations 612618. The operations 610 focus on training, testing and evaluating a machine learning model, e.g. the demand forecast model 392. One objective of this model is to predict sales velocity or rate under current price of an item. This can be used to determine whether the current price is low enough to clear excess inventory by the end date of the markdown period for the item. In some embodiments, the prediction of demand or sales rate can be treated as a supervised regression problem, such that the system can train a light gradient-boosting machine learning model (LightGBM) with item level features, e.g. on a monthly or quarterly basis.

At operation 612, a training dataset and a testing dataset are prepared. For example, the training dataset may be generated by sampling items from various general e-commerce items, while ensuring coverage of different divisions, different price levels, and different sales levels. In some embodiments, items with more price changes are preferred to be put into the training dataset. The testing dataset may be generated by sampling items from previous markdown processes or an initial period of the markdown process, while ensuring coverage of low and high sales periods, different divisions, different price levels, and different sales levels.

At operation 614, various historical features of a plurality of items offered for purchase on the website can be collected and extracted. In some embodiments, the features may include at least one of: date and holiday related features, lagged sales features, inventory features, division features, categorical features, and aggregated features generated from a plurality of most recent markdowns. For example, the aggregated features may be constructed to extract behavior of each of the recent three price markdowns including three price levels relative to historical max and min prices, price change percentage, duration and average daily sales of each markdown. In some embodiments, the day related features can indicate which day in a week, e.g. Monday, Thursday or weekend, for a transaction or sale. In some embodiments, the holiday related features can capture all the holiday demands by indicating which holiday season or shopping season is related to a transaction or sale. In some embodiments, the lagged sales features are related to sales in a previous time period, e.g. previous one, two or seven days. In some embodiments, the inventory features are related to current inventory of the item. In some embodiments, the division features are related to all the departments and categories of an item. In some embodiments, the historical max and min prices may be max and min prices in a previous whole year. In some embodiments, the duration of each markdown may be equal to one or more cadences. In some embodiments, the aggregation may be performed based on the duration of the markdown period. For example, the average daily sales may be computed based on an average of all daily sales during the markdown period.

At operation 616, the demand forecast model, which may be a light gradient-boosting machine learning model, is trained based on these features using the training dataset. In addition, the model can be tested using the testing dataset, and evaluated at operation 618. In some embodiments, the metrics like Mean Absolute Percent Error (MAPE), Root Mean Squared Error (RMSE), Mean Absolute Error (MAE), can be used to evaluate distribution of metrics over testing items based on the trained model to ensure its performance. The trained demand forecast model can be stored in database 620, which may be part of the database 116 or a standalone database.

Then at operations 630, the trained demand forecast model is utilized to forecast demand for each item desired to reach a target inventory. In some embodiments, the operations 630 may be included in the operation 510 in FIG. 5. The operations 630 include operations 632 and 634. At operation 632, for each item, data related to transactions of the item via the website can be collected for the item to construct features for the item based on the collected data. For example, the system may call a forecasting script and/or a data query script, which may be used to collect and aggregate most updated features for the item.

At operation 634, the constructed features can be fed into the trained demand forecast model to generate the predicted demand data for the item. For example, the system may extract the trained demand forecast model from the database 620, and apply it on the constructed features for the item to generate the predicted demand data. In some embodiments, the predicted demand data includes a predicted sales rate for the item, and is stored in database 640, which may be part of the database 116 or a standalone database.

In some embodiments, the operations 630 may be performed on a daily basis. As such, in each daily run, the system can construct and update features for each item with the newly collected data describing most up-to-date behavior of this item, and then feed features into the LightGBM model to obtain the predicted sales rate.

Figure 7:
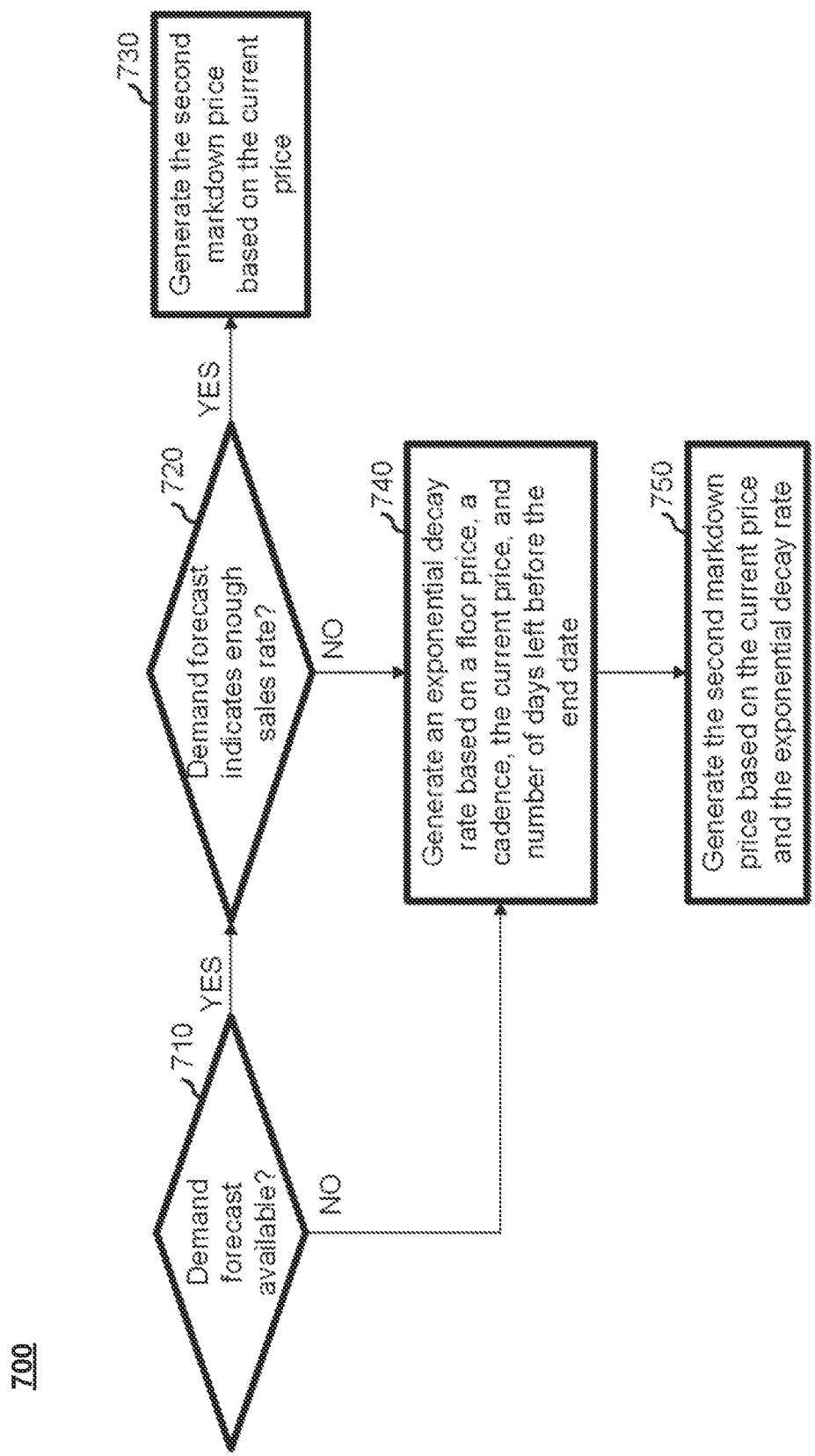
FIG. 7 illustrates an exemplary process for generating a markdown price based on a gradual liquidation pricing model, in accordance with some embodiments of the present teaching.

FIG. 7 illustrates an exemplary process 700 for generating a markdown price based on a gradual liquidation pricing model, in accordance with some embodiments of the present teaching. In some embodiments, the process 700 may be carried out by one or more computing devices, such as the dynamic price computing device 102 and/or the cloud-based engine 121 of FIG. 1. In some embodiments, the process 700 may be carried out by the second pricing engine 409 in the dynamic price computing device 102. In some embodiments, the operations in FIG. 7 may be included in the operation 514 in FIG. 5. In this case, a gradual liquidation pricing model is used to deal with items that may not have the coverage of price elasticity data. This may be due to the fact that some items are in the ramp up stage and there is not enough historical sales data to infer elasticity. Even if the time on market is long enough, considering the reason why these items are sent to the markdown pipeline, their historical sales may be relatively low and not enough to infer elasticity. Therefore, the gradual liquidation pricing model is disclosed here to gradually reduce the item price based on the newly observed data, to control sales velocity to be in a desired pace.

As shown in FIG. 7, the process 700 starts from operation 710, where it is determined whether the demand forecast data (or predicted demand data) is available for the item desired to reach the target inventory. If yes, the process goes to operation 720, to determine whether the demand forecast data indicates that the predicted sales rate is enough for the item to reach the target inventory by the end date of the markdown period. If so, the process goes to operation 730, to compute the second markdown price based on the current price. For example, the second markdown price may be equal to the current price when the predicted sales rate is enough for the item to reach the target inventory by the end date of the markdown period. That is, there is no need to update the price of the item at this point.

When it is determined at operation 720 that the predicted sales rate is not enough for the item to reach the target inventory by the end date, or when it is determined at operation 710 that the predicted demand data is not available, the process goes to operation 740, to compute an exponential decay rate based on: the floor price for the item, the current price of the item, the cadence, and a number of days left before the end date of the markdown period. Then at operation 750, the second markdown price is computed based on the current price and the exponential decay rate.

In some embodiments, if the predicted sales velocity is not enough to clear inventory before the end date or the predicted sales rate is not available for this item, the second markdown price may be calculated based on the following equation.

$$\text{Second markdown price} = \text{Current price} \times \left(\frac{\text{Floor price}}{\text{Current price}}\right)^{\frac{1}{\text{number of price changes left}}}, \quad (2)$$

where number of price changes left is calculated with the number of days left in the markdown period divided by the cadence.

Figure 8A:
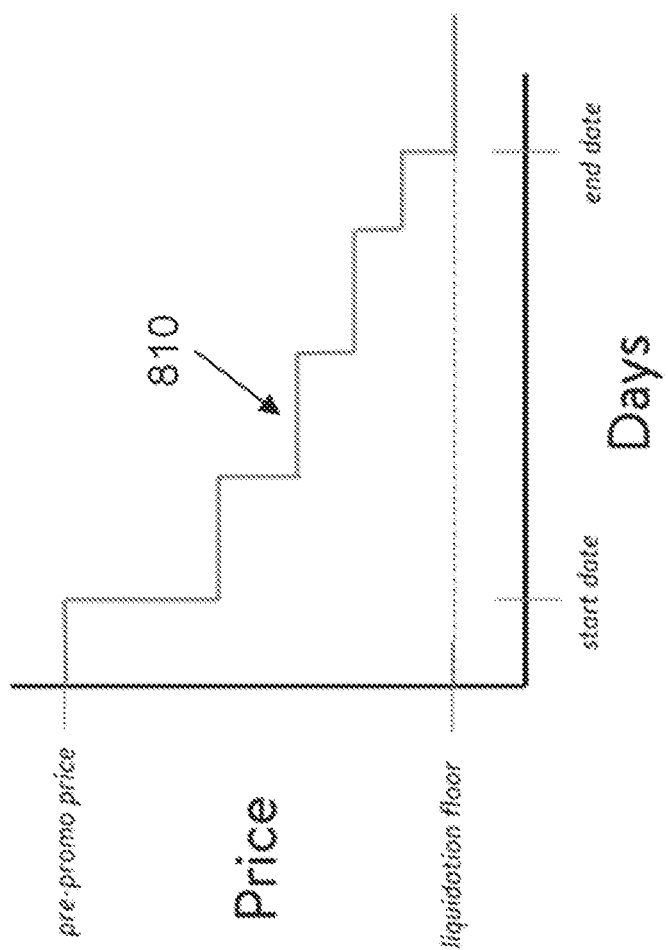
FIG. 8A illustrates an exemplary markdown pattern of a gradual liquidation pricing model, in accordance with some embodiments of the present teaching.

FIG. 8A illustrates an exemplary markdown pattern 810 of a gradual liquidation pricing model, in accordance with some embodiments of the present teaching. As shown in FIG. 8A, the price of the item gradually reduces, cadence by cadence, from a pre-promotion price at the start date of the markdown period to a liquidation floor price at the end date of the markdown period, according to the markdown pattern 810. In some embodiments, the pre-promotion price is a price of the item before the markdown process; and the liquidation floor price is a minimum price set by the merchant for the markdown process.

Figure 8B:
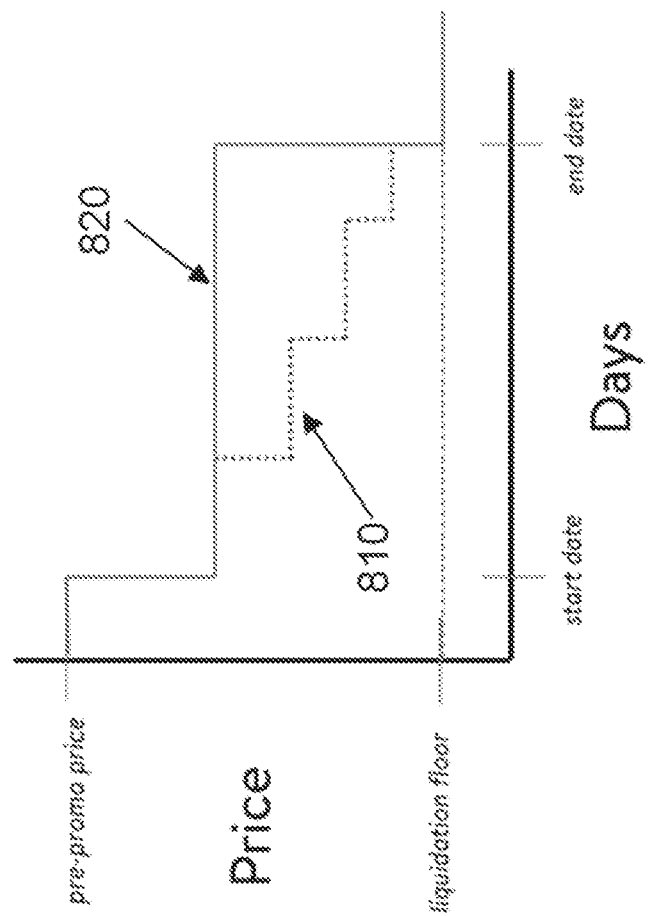
FIG. 8B illustrates another exemplary markdown pattern of the gradual liquidation pricing model, in accordance with some embodiments of the present teaching.

FIG. 8B illustrates another exemplary markdown pattern 820 of the gradual liquidation pricing model, in accordance with some embodiments of the present teaching. As shown in FIG. 8B, as the price of the item gradually reduces according to the markdown pattern 810, at some point the demand forecast may indicate that the item can hit the target inventory at the end date, e.g. by a comparison between a desired sales rate and a predicted sales rate of the item. Then the system will not reduce the price of the item anymore, and can just hold the price to the end date according to the markdown pattern 820.

Figure 9:
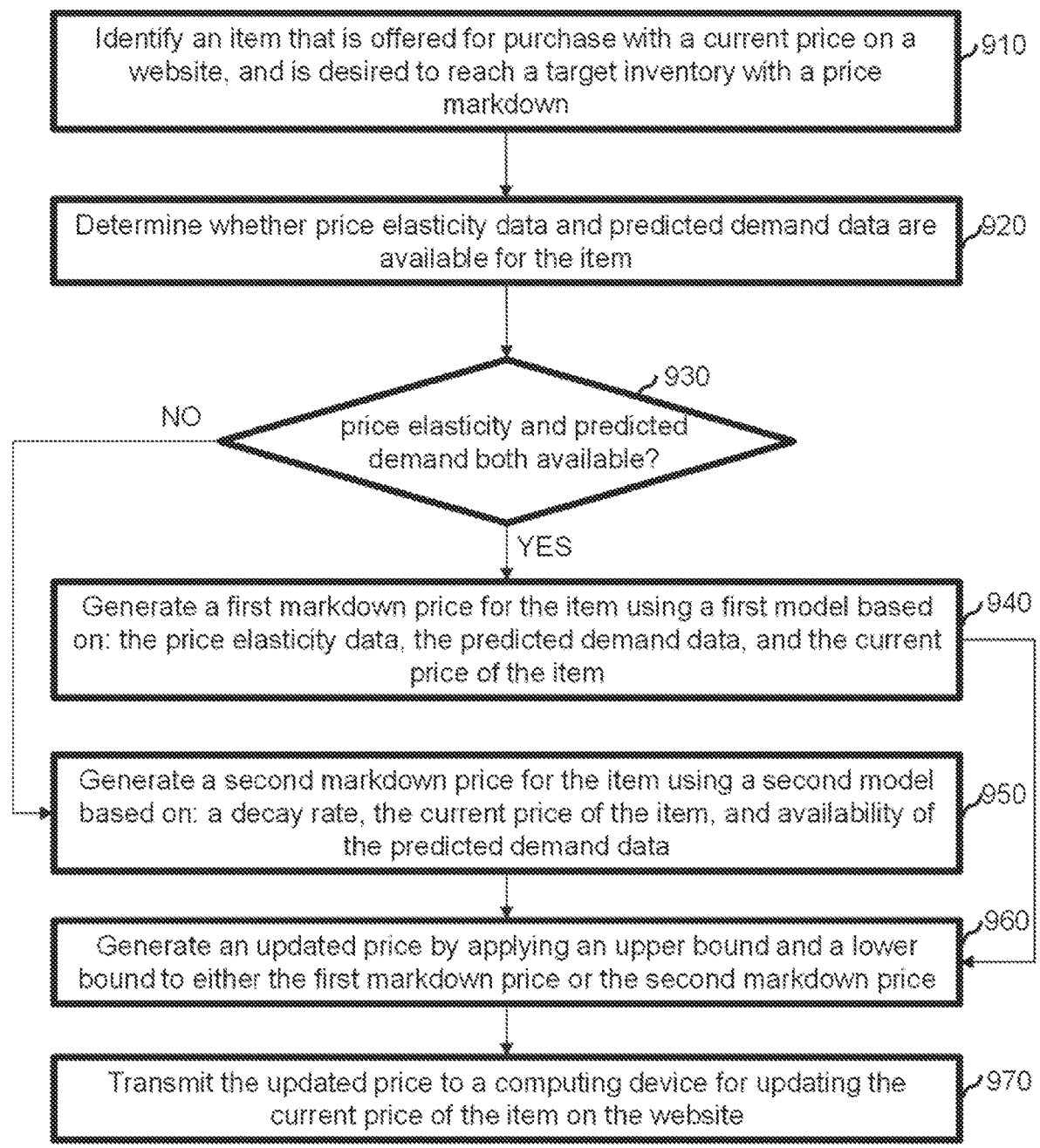
FIG. 9 is a flowchart illustrating an exemplary method for dynamically and automatically updating item prices on e-commerce platform, in accordance with some embodiments of the present teaching.

FIG. 9 a flowchart illustrating an exemplary method 900 for dynamically and automatically updating item prices on e-commerce platform, in accordance with some embodiments of the present teaching. In some embodiments, the method 900 can be carried out by one or more computing devices, such as the dynamic price computing device 102 and/or the cloud-based engine 121 of FIG. 1. Beginning at operation 910, an item is identified, where the item is offered for purchase with a current price on a website and is desired to reach a target inventory with a price markdown. At operation 920, it is determined whether price elasticity data and predicted demand data are available for the item. At operation 930, if the price elasticity and predicted demand are both available for the item, the method goes to operation 940, where a first markdown price is generated for the item using a first model based on: the price elasticity data, the predicted demand data, and the current price of the item, and the method then goes to operation 960.

If, at operation 930, the price elasticity and predicted demand are not both available for the item, the method goes to operation 950, where a second markdown price is generated for the item using a second model based on: a decay rate, the current price of the item, and availability of the predicted demand data, and the method then goes to operation 960.

At the operation 960, an updated price is generated by applying an upper bound and a lower bound to either the first markdown price or the second markdown price. The updated price is transmitted at operation 970 to a computing device for updating the current price of the item on the website.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

Each functional component described herein can be implemented in computer hardware, in program code, and/or in one or more computing systems executing such program code as is known in the art. As discussed above with respect to FIG. 2, such a computing system can include one or more processing units which execute processor-executable program code stored in a memory system. Similarly, each of the disclosed methods and other processes described herein can be executed using any suitable combination of hardware and software. Software program code embodying these processes can be stored by any non-transitory tangible medium, as discussed above with respect to FIG. 2.

The foregoing is provided for purposes of illustrating, explaining, and describing embodiments of these disclosures. Modifications and adaptations to these embodiments will be apparent to those skilled in the art and may be made without departing from the scope or spirit of these disclosures. Although the subject matter has been described in terms of exemplary embodiments, it is not limited thereto. Rather, the appended claims should be construed broadly, to include other variants and embodiments, which can be made by those skilled in the art.

What is claimed is:

1. A system, comprising:
  a non-transitory memory having instructions stored thereon; and
  at least one processor operatively coupled to the non-transitory memory, and configured to read the instructions to:
    receive via a first computing device item information, wherein the item information is input via an integrated interface of a website accessible by at least one other computing device;
    identify, based on the item information, an item being offered for purchase with a current price on the website, wherein the item is desired to reach a target inventory with a price markdown;
    determine whether price elasticity data is available for the item;
    determine whether predicted demand data is available for the item;
    when the price elasticity data and the predicted demand data are both available for the item, generate a first markdown price for the item using a first model based on: the price elasticity data, the predicted demand data, a first decay rate, and the current price of the item;
    when the price elasticity data and the predicted demand data are not both available for the item, generate a second markdown price for the item using a second model based on: a second decay rate distinct from the first decay rate, the current price of the item, and availability of the predicted demand data;
    generate a bounded price by applying an upper bound and a lower bound to either the first markdown price or the second markdown price;
    transmit the bounded price to a second computing device for updating the current price of the item on the website in real time, wherein the current price of the item is updated automatically on the website based on the bounded price such that an updated price of the item is displayed to user devices accessing the website;
    while displaying the website to one or more of the user devices accessing the website, capture one or more of user session data and user transaction data based on interactions by one or more of the user devices with the website;
    update one or more of the price elasticity data and the predicted demand data based on, at least, the user session data and the user transaction data;
    determine, based on the item information, whether first updated price criteria are satisfied;
    in accordance with a determination that the first updated price criteria are satisfied:
      determine an updated bounded price based on, at least, one or more of the updated price elasticity data and the updated predicted demand data; and
      transmit the updated bounded price to the second computing device for updating the updated price of the item on the website in real time such that a new updated price of the item, based on the updated bounded price, is displayed to one or more of the user devices accessing the website;
      while displaying the updated price of the item on the website to one or more of the user devices, capture additional interactions by one or more of the user devices with the website, and adjust a cadence characterizing a minimum duration between real-time price updates based on the captured additional interactions; and
    in accordance with a first determination that second updated price criteria are satisfied and a second determination that the cadence is satisfied based on when the updated bounded price was transmitted to the second computing device for updating the updated price of the item:
      transmit a request to remove the price markdown to the second computing device; and update the updated price of the item on the website in real time such that the current price of the item is displayed to one or more of the user devices accessing the website.

2. The system of claim 1, wherein:
the second computing device is associated with a web server hosting the website; and
the item is to be displayed with the bounded price on a webpage of the website, wherein the webpage includes at least one of: a home page of the website, a grocery page including grocery items, an item page including an anchor item, or a promotion page including seasonal or holiday deals.

3. The system of claim 1, wherein the inputs provided via the integrated interface of the first computing device indicate the following information regarding the item: an identification of the item, a start date of a markdown period, an end date of the markdown period, the target inventory, a floor price, and the cadence.

4. The system of claim 3, wherein the at least one processor is further configured to read the instructions to:
extract the item from a markdown pipeline;
determine whether the item has reached the target inventory;
determine whether a current time has reached the end date of the markdown period;
stop a markdown process for the item when the item has reached the target inventory or the current time has reached the end date;
when the item has not reached the target inventory and the current time has not reached the end date, determine whether the current price can be changed based on: the cadence, the current time, and a previous date when the item's price was changed last time; and
when the current price cannot be changed, put the item back into the markdown pipeline without price update.

5. The system of claim 4, wherein:
it is determined whether the price elasticity data is available for the item when the current price can be changed; and
it is determined whether the predicted demand data is available for the item when the current price can be changed.

6. The system of claim 3, wherein the at least one processor is further configured to read the instructions to:
collect, for the item, data related to transactions of the item via the website;
construct features for the item based on the collected data; and
feed the constructed features into a light gradient-boosting machine learning model to generate the predicted demand data for the item, wherein predicted demand data includes a predicted sales rate for the item.

7. The system of claim 6, wherein the at least one processor is further configured to read the instructions to:
obtain historical features of a plurality of items offered for purchase on the website, wherein the historical features include at least one of: date and holiday related features, lagged sales features, inventory features, division features, and aggregated features generated from a plurality of most recent markdowns; and
train the light gradient-boosting machine learning model based on the historical features.

8. The system of claim 6, wherein the first markdown price is generated based on:

computing a desired sales rate for the item based on: a current inventory of the item, the target inventory of the item, and a number of days left before the end date;
computing the first decay rate for the item based on: the desired sales rate, the predicted sales rate, and the price elasticity data; and
computing the first markdown price based on the current price and the first decay rate.

9. The system of claim 6, wherein the second markdown price is generated based on:
when the predicted demand data is available, determining whether the predicted demand data indicates that the predicted sales rate is enough for the item to reach the target inventory by the end date;
computing the second markdown price based on the current price when the predicted sales rate is enough for the item to reach the target inventory by the end date; and
when the predicted sales rate is not enough for the item to reach the target inventory by the end date or when the predicted demand data is not available:
computing the second decay rate based on: the floor price, the current price, the cadence, and a number of days left before the end date, wherein the second decay rate is an exponential decay rate, and
computing the second markdown price based on the current price and the second decay rate.

10. The system of claim 1, wherein the at least one processor is further configured to read the instructions to:
computing the upper bound based on a minimum of (a) the current price and (b) a universal upper bound; and
computing the lower bound based on a maximum of (c) a discounted price by applying a maximum allowed discount on the current price and (d) a universal lower bound.

11. A computer-implemented method, comprising:
receiving via a first computing device item information, wherein the item information is input via an integrated interface of a website accessible by at least one other computing device;
identifying, based on the item information, an item being offered for purchase with a current price on the website, wherein the item is desired to reach a target inventory with a price markdown;
determining whether price elasticity data is available for the item;
determining whether predicted demand data is available for the item;
when the price elasticity data and the predicted demand data are both available for the item, generating a first markdown price for the item using a first model based on:
the price elasticity data, the predicted demand data, a first decay rate, and the current price of the item;
when the price elasticity data and the predicted demand data are not both available for the item, generating a second markdown price for the item using a second model based on: a second decay rate distinct from the first decay rate, the current price of the item, and availability of the predicted demand data;
generating a bounded price by applying an upper bound and a lower bound to either the first markdown price or the second markdown price; and
transmitting the bounded price to a second computing device for updating the current price of the item on the website in real time, wherein the current price of the item is updated automatically on the website based on the bounded price such that an updated price of the item is displayed to user devices accessing the website;

while displaying the website to one or more of the user devices accessing the website, capturing one or more of user session data and user transaction data based on interactions by one or more of the user devices with the website;

updating one or more of the price elasticity data and the predicted demand data based on, at least, the user session data and the user transaction data;

determining, based on the item information, whether first updated price criteria are satisfied;

in accordance with a determination that the first updated price criteria are satisfied:

determining an updated bounded price based on, at least, one or more of the updated price elasticity data and the updated predicted demand data; and transmitting the updated bounded price to the second computing device for updating the updated price of the item on the website in real time such that a new updated price of the item, based on the updated bounded price, is displayed to one or more of the user devices accessing the website;

while displaying the updated price of the item on the website to one or more of the user devices, capturing additional interactions by one or more of the user devices with the website, and adjusting a cadence characterizing a minimum duration between real-time price updates based on the captured additional interactions; and in accordance with a first determination that second updated price criteria are satisfied and a second determination that the cadence is satisfied based on when the updated bounded price was transmitted to the second computing device for updating the updated price of the item:

transmitting a request to remove the price markdown to the second computing device; and updating the updated price of the item on the website in real time such that the current price of the item is displayed to one or more of the user devices accessing the website.

12. The computer-implemented method of claim 11, wherein inputs provided via the integrated interface of the first computing device indicate the following information regarding the item: an identification of the item, a start date of a markdown period, an end date of the markdown period, the target inventory, a floor price, and the cadence.

13. The computer-implemented method of claim 12, further comprising:

extracting the item from a markdown pipeline;

determining whether the item has reached the target inventory;

determining whether a current time has reached the end date of the markdown period;

stopping a markdown process for the item when the item has reached the target inventory or the current time has reached the end date;

when the item has not reached the target inventory and the current time has not reached the end date, determining whether the current price can be changed based on:

the cadence, the current time, and a previous date when the item's price was changed last time; and when the current price cannot be changed, putting the item back into the markdown pipeline without price update, wherein:

it is determined whether the price elasticity data is available for the item when the current price can be changed, and it is determined whether the predicted demand data is available for the item when the current price can be changed.

14. The computer-implemented method of claim 12, further comprising:

collecting, for the item, data related to transactions of the item via the website;

constructing features for the item based on the collected data; and feeding the constructed features into a light gradient-boosting machine learning model to generate the predicted demand data for the item, wherein predicted demand data includes a predicted sales rate for the item.

15. The computer-implemented method of claim 14, further comprising:

obtaining historical features of a plurality of items offered for purchase on the website, wherein the historical features include at least one of: date and holiday related features, lagged sales features, inventory features, division features, and aggregated features generated from a plurality of most recent markdowns; and training the light gradient-boosting machine learning model based on the historical features.

16. The computer-implemented method of claim 14, wherein generating the first markdown price comprises:

computing a desired sales rate for the item based on: a current inventory of the item, the target inventory of the item, and a number of days left before the end date;

computing the first decay rate for the item based on: the desired sales rate, the predicted sales rate, and the price elasticity data; and computing the first markdown price based on the current price and the first decay rate.

17. The computer-implemented method of claim 14, wherein generating the second markdown price comprises:

when the predicted demand data is available, determining whether the predicted demand data indicates that the predicted sales rate is enough for the item to reach the target inventory by the end date;

computing the second markdown price based on the current price when the predicted sales rate is enough for the item to reach the target inventory by the end date; and when the predicted sales rate is not enough for the item to reach the target inventory by the end date or when the predicted demand data is not available:

computing the second decay rate based on: the floor price, the current price, the cadence, and a number of days left before the end date, wherein the second decay rate is an exponential decay rate, and computing the second markdown price based on the current price and the second decay rate.

18. The computer-implemented method of claim 17, further comprising:

computing the upper bound based on a minimum of (a) the current price and (b) a universal upper bound; and computing the lower bound based on a maximum of (c) a discounted price by applying a maximum allowed discount on the current price and (d) a universal lower bound.

19. A non-transitory computer readable medium having instructions stored thereon, wherein the instructions, when executed by at least one processor, cause at least one device to perform operations comprising:

receiving via a first computing device item information, wherein the item information is input via an integrated interface of a website accessible by at least one other computing device;

identifying, based on the item information, an item being offered for purchase with a current price on the website, wherein the item is desired to reach a target inventory with a price markdown;

determining whether price elasticity data is available for the item;

determining whether predicted demand data is available for the item;

when the price elasticity data and the predicted demand data are both available for the item, generating a first markdown price for the item using a first model based on: the price elasticity data, the predicted demand data, a first decay rate, and the current price of the item;

when the price elasticity data and the predicted demand data are not both available for the item, generating a second markdown price for the item using a second model based on: a second decay rate distinct from the first decay rate, the current price of the item, and availability of the predicted demand data;

generating a bounded price by applying an upper bound and a lower bound to either the first markdown price or the second markdown price; and transmitting the bounded price to a second computing device for updating the current price of the item on the website in real time, wherein the current price of the item is updated automatically on the website based on the bounded price such that an updated price of the item is displayed to user devices accessing the website;

while displaying the website to one or more of the user devices accessing the website, capturing one or more of user session data and user transaction data based on interactions by one or more of the user devices with the website;

updating one or more of the price elasticity data and the predicted demand data based on, at least, the user session data and the user transaction data;

determining, based on the item information, whether the updated price criteria are satisfied;

in accordance with a determination that the first updated price criteria areis satisfied:
 determining an updated bounded price based on, at least, one or more of the updated price elasticity data and the updated predicted demand data, and
 transmitting the updated bounded price to the second computing device for updating the updated price of the item on the website in real time such that a new updated price of the item, based on the updated bounded price, is displayed to one or more of the user devices accessing the website;

while displaying the updated price of the item on the website to one or more of the user devices, capturing additional interactions by one or more of the user devices with the website, and adjusting a cadence characterizing a minimum duration between real-time price updates based on the captured additional interactions; and in accordance with a first determination that second updated price criteria are satisfied and a second determination that the cadence is satisfied based on when the updated bounded price was transmitted to the second computing device for updating the updated price of the item:
 transmitting a request to remove the price markdown to the second computing device; and
 updating the updated price of the item on the website in real time such that the current price of the item is displayed to one or more of the user devices accessing the website.

20. The non-transitory computer readable medium of claim 19, wherein the instructions, when executed by the at least one processor, further cause the at least one device to perform operations comprising:

wherein inputs provided via the integrated interface of the first computing device indicate the following information regarding the item: an identification of the item, a start date of a markdown period, an end date of the markdown period, the target inventory, a floor price, and the cadence;

extracting the item from a markdown pipeline;

determining whether the item has reached the target inventory;

determining whether a current time has reached the end date of the markdown period;

stopping a markdown process for the item when the item has reached the target inventory or the current time has reached the end date;

when the item has not reached the target inventory and the current time has not reached the end date, determining whether the current price can be changed based on:

the cadence, the current time, and a previous date when the item's price was changed last time; and when the current price cannot be changed, putting the item back into the markdown pipeline without price update, wherein:
 it is determined whether the price elasticity data is available for the item when the current price can be changed, and
 it is determined whether the predicted demand data is available for the item when the current price can be changed.

* * * * *